(12) United States Patent
Buch et al.

(10) Patent No.: US 10,459,477 B2
(45) Date of Patent: Oct. 29, 2019

(54) COMPUTING SYSTEM WITH POWER VARIATION ATTACK COUNTERMEASURES

(71) Applicant: Seagate Technology, LLC, Cupertino, CA (US)

(72) Inventors: Bruce D. Buch, Westborough, MA (US); Nicholas P. Mati, Longmont, CO (US); Matthew D. Rench, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 157 days.

(21) Appl. No.: 15/491,654

(22) Filed: Apr. 19, 2017

(65) Prior Publication Data

US 2018/0307835 A1 Oct. 25, 2018

(51) Int. Cl.
*G06F 21/55* (2013.01)
*G06F 1/08* (2006.01)
*G06F 21/75* (2013.01)

(52) U.S. Cl.
CPC ............ *G06F 1/08* (2013.01); *G06F 21/75* (2013.01); *G06F 21/755* (2017.08); *G06F 2221/034* (2013.01)

(58) Field of Classification Search
CPC ............ H03K 5/135; H03K 5/1565; H03K 2005/00032; H03K 2005/00071; H03K 17/00; H03L 7/0814; H03M 1/0641; G06F 21/558; G06F 1/08; G06F 1/022; G06F 2211/902; G06F 11/22; G06F 21/755; G06F 21/75; G06F 2221/034
USPC .............................................. 726/23; 714/25
See application file for complete search history.

(56) References Cited

U.S. PATENT DOCUMENTS

| 4,686,509 A * | 8/1987 | Araki ............... H03M 1/0641 341/122 |
| 5,231,636 A | 7/1993 | Rasmussen |
| 5,381,416 A * | 1/1995 | Vartti .................... G06F 1/10 327/292 |
| 6,654,884 B2 | 11/2003 | Jaffe et al. |

(Continued)

FOREIGN PATENT DOCUMENTS

EP 1263139 A2 * 5/2002

OTHER PUBLICATIONS

Massimo Alioto et al., Low-overhead countermeasures to protect Pre-charged busses against Power Analysis attacks, Dec. 19-22, 2009, 2009 International Conference on Microelectronics—ICM, pp. 165-168.*

*Primary Examiner* — Abu S Sholeman
*Assistant Examiner* — Raied A Salman
(74) *Attorney, Agent, or Firm* — Hall Estill Attorneys at Law (57) ABSTRACT

A computing system can be arranged to generate a range of different frequencies with at least one oscillator of a clock module prior to providing a first clock frequency to a controller with a channel selector of the clock module in response to a dither control circuit. A system operation may be executed with the controller before the first clock frequency is changed to a second clock frequency during the execution of the system operation as directed by the dither control circuit. The second clock frequency can be chosen from the range of different frequencies.
The computing system may return to the first clock frequency at the conclusion of the execution of the system operation.

19 Claims, 4 Drawing Sheets

(56) References Cited

U.S. PATENT DOCUMENTS

| | | |
|---|---|---|
| 6,748,535 B1 | 6/2004 | Ryan, Jr. et al. |
| 6,807,232 B2 | 10/2004 | Nicholson et al. |
| 7,417,468 B2 | 8/2008 | Verbauwhede et al. |
| 7,426,629 B2 | 9/2008 | Piry et al. |
| 7,599,488 B2 | 10/2009 | Kocher et al. |
| 7,639,058 B2 | 12/2009 | Kurokawa et al. |
| 7,756,231 B2 * | 7/2010 | Quiroga .................. H03L 7/00 370/342 |
| 7,870,336 B2 | 1/2011 | Erlingsson et al. |
| 8,334,705 B1 | 12/2012 | Gunnam et al. |
| 8,427,194 B2 | 4/2013 | Deas et al. |
| 8,635,467 B2 | 1/2014 | Gunnam et al. |
| 8,879,724 B2 | 11/2014 | Kocher et al. |
| 9,250,671 B2 | 2/2016 | Tucker |
| 9,343,162 B2 | 5/2016 | Tasher et al. |
| 9,436,603 B1 | 9/2016 | Pohlack |
| 10,067,550 B2 * | 9/2018 | Journet ................ G06F 9/3869 |
| 2005/0077934 A1 * | 4/2005 | Fahim .................... G06F 1/022 327/155 |
| 2008/0091975 A1 * | 4/2008 | Kladko ................. G06F 11/277 714/25 |
| 2011/0260749 A1 | 10/2011 | Deas et al. |
| 2012/0204056 A1 | 8/2012 | Airaud et al. |
| 2013/0007881 A1 | 1/2013 | Liem et al. |
| 2015/0082434 A1 | 3/2015 | Sethumadhavan et al. |
| 2015/0365228 A1 | 12/2015 | Belenky |
| 2016/0147562 A1 * | 5/2016 | Ferrandiz ............. G06F 9/4843 718/101 |
| 2017/0090542 A1 * | 3/2017 | Socarras ................ G06F 1/324 |
| 2017/0344759 A1 * | 11/2017 | Choi ....................... G06F 1/06 |
| 2018/0307835 A1 * | 10/2018 | Buch ....................... G06F 1/08 |

* cited by examiner

COMPUTING SYSTEM WITH POWER VARIATION ATTACK COUNTERMEASURES

SUMMARY

A computing system, in accordance with some embodiments, generates a range of different frequencies with at least one oscillator of a clock module prior to providing a first clock frequency to a controller with a channel selector of the clock module in response to a dither control circuit. A system operation is executed with the controller before the first clock frequency is changed to a second clock frequency during the execution of the system operation as directed by the dither control circuit. The second clock frequency is chosen from the range of different frequencies and the computing system returns to the first clock frequency at the conclusion of the execution of the system operation.

Other embodiments configure a computing system to generate a range of different frequencies with an oscillator of a clock module then provide a first clock frequency to a controller with of the clock module in response to a dither control circuit. A first system operation is executed with the controller prior to the first clock frequency sequentially switched to second and third clock frequencies at random times during the execution of the system operation as directed by the dither control circuit. The computing system returns to first clock frequency at the conclusion of the execution of the system operation.

A computing system, in other embodiments, has a controller connected to a clock module that has a channel selector and an oscillator. The channel selector is arranged to provide multiple different clock frequencies over time in response to the controller in conjunction with an interval timer and a clock dither control circuit.

DETAILED DESCRIPTION

Continued advancement of computing technology has allowed increasing amounts of personal information to be stored digitally. The storage of sensitive information electronically has placed an emphasis on heightened security protocol to mitigate the risk of unwanted attacks on the personal digital data.

Secret information, like cryptographic keys, can be extracted directly from computing hardware, such as memories and processors, and during the use of the that information by computing hardware by observing data-dependent power variations that occur while an algorithm processes the information. System noise can obscure simple observation of minute power variations, but some variations of interest can still be extracted from the noise via repetitive capture and coherent integration techniques.

Accordingly, assorted embodiments are generally directed to the generation and use of a clock signal that randomly hops between different frequencies during the execution of selected system operations. By changing between different clock frequencies during critical execution sequences, the time correlation of power variations is obscured from repetition of the critical execution sequences.

It is contemplated that a single-frequency clock can be disabled randomly to thwart side-channel attacks that observe data-dependent power variations. However, such a technique can degrade system performance by degrading execution time, particularly when numerous clock stoppages are introduced. The various embodiments of the present disclosure that intelligently employ clock frequency hopping to random frequencies at random times during execution of a system operation allow a computing system to remain running at full capability despite the use of reduced clock rates.

Figure 1:
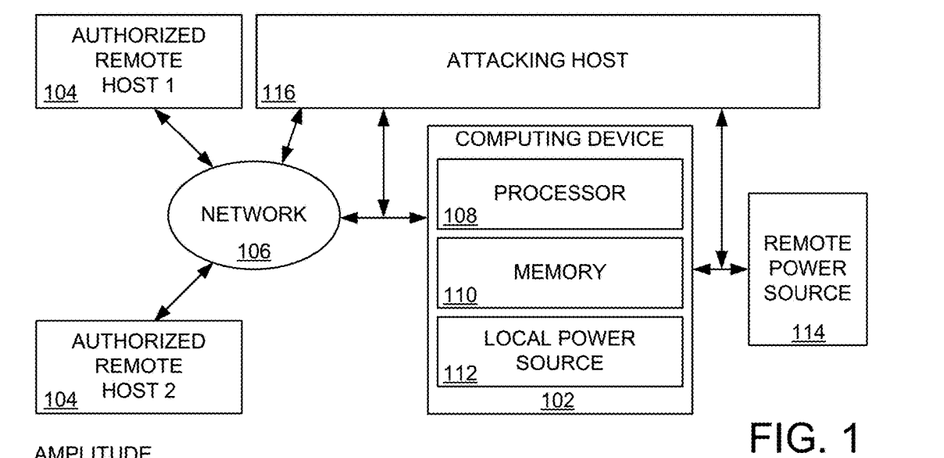
FIG. 1 is a block representation of an example computing system arranged in accordance with some embodiments.

FIG. 1 displays an example computing system 100 in which various embodiments of the present disclosure can be practiced. The system 100 can employ any number, and type, of computing device 102 that is connected to one or more remote hosts 104 via a wired and/or wireless network 106. For instance, the computing system 100 can connect multiple different remote hosts 104 to two different computing devices 102, such as a hard disc drive (HDD) and non-volatile solid-state memory, to provide sequential or concurrent data access, which can be a data read or a data write.

A computing device 102 may alternatively be a computer, smartphone, server, or network node. In the non-limiting embodiment shown in FIG. 1, the computing device has a local processor 108, such as a programmable controller, that communicates with at least one local non-volatile memory 110. The computing device 102 can consist of additional local circuitry that can provide data storage, data generation, and data communication operations. The computing device 102 can draw electrical power from any number of local 112 or remote 114 power sources.

Although any number of remote hosts 104 can be authorized for access to one or more computing devices 102, a remote host may gain access in an unauthorized manner. Such access can be characterized as an attacking host 116 that attempts to monitor, alter, or steal data and/or information about the computing device 102. For example, the attacking host 116 can steal data from, alter data in, monitor power consumption by, and insert data into the computing device 102. The unauthorized access may involve the network 106 or via direct connection to a power pathway, such as via a resistor connected to a power, or ground, input of the computing device 102.

Regardless of how the attacking host 116 is able to monitor the power draw of the computing device 102, analysis of power variations during system operations, such as encryption, decryption, security protocol, and assorted data processes involving sensitive data, can discern data sequences that can be used to attack the computing device. That is, the attacking host 116 can detect power variations of the computing device 102 in one or more manners that render internal device information that can be used to gain unauthorized access to the computing device 102.

Figure 2A:
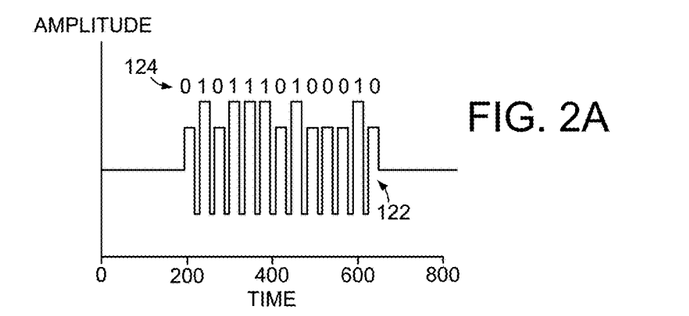
FIGS. 2A-2C respectively display example operational data associated with the computing system of FIG. 1.
Figure 2B:
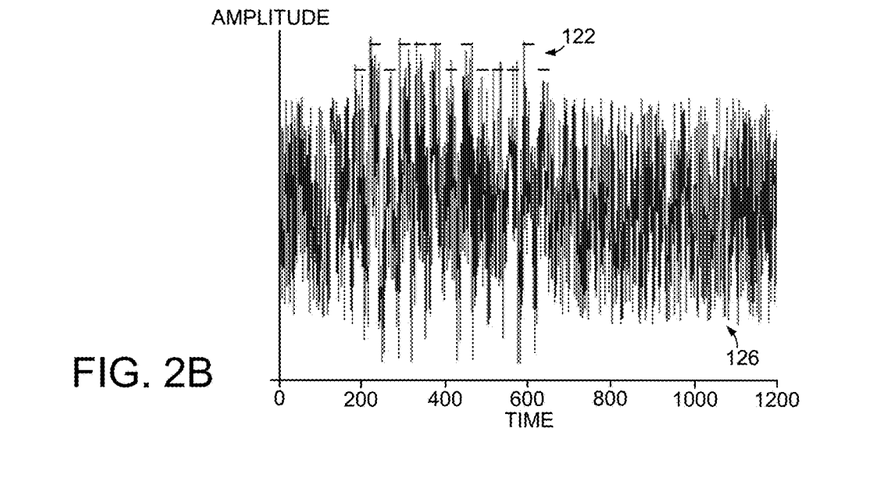
Figure 2C:
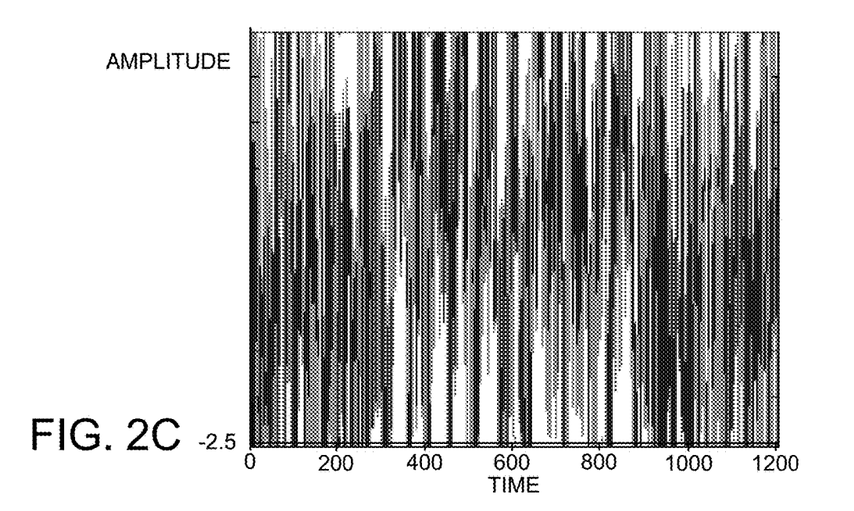

FIGS. 2A-2C respectively plot an example power sequence 122 corresponding with the execution of the data pattern 124 by a computing device in a computing system, such as system 100 of FIG. 1. As shown in FIG. 2A, the power sequence 122 has a varying signal amplitude over time.

System noise, such as electrical noise and purposely induced dither noise, can obscure the power sequence 122. Nevertheless, sophisticated attacking hosts can utilize statistical methods to extract side-channel information from the noise via repetitive capture of power pin variations or other emissions (e.g., electromagnetic radiation, thermal effects, etc.) during processing of the data sequence 124. FIG. 2B illustrates the example power sequence 122 obscured by noise 126. The power sequence 122 is partially shown to convey how repeated evaluation of the noise-filled power consumption can provide some, or all, of the data sequence 124.

FIG. 2C graphs monitored power variations over more than one hundred data sequence 122 executions as a result of altering a clock to random frequencies at random times in accordance with various embodiments. It is noted that the power variations of FIG. 2C are present with noise, which can be naturally occurring or artificially inserted into the power stream from a power source. The use of different clock frequencies can enhance the obscuring of the time correlation of the power sequence 122 to the data sequence 124, but repeated data sequence 124 execution can still render the data sequence 122. Hence, random clock frequencies are utilized at random times so that repeated data sequence 124 executions do not clarify the noise obstruction of the time correlation between data 122 and power 122 sequences.

Figure 3:
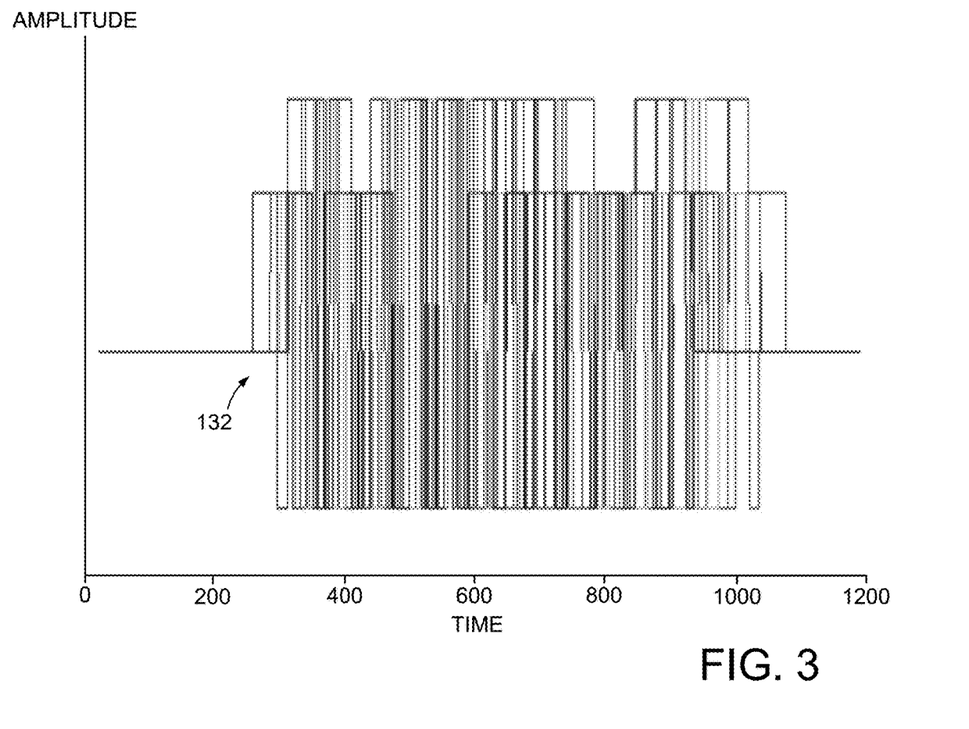
FIG. 3 plots operational data for a computing system configured in accordance with various embodiments.

FIG. 3 provides a noise-less power sequence 132 that results from clock frequency dithering in accordance with assorted embodiments in a computing system. The frequency dithering involves identifying a data sequence to be obscured and inducing shifts to random clock frequencies at random times. It can be appreciated from the power sequence 132 that clock frequency dithering alters both the voltage draw (graphed amplitude) and time domain of the power consumed by a computing system to de-correlate the time of events even when a data sequence is repeatedly executed.

Figure 4:
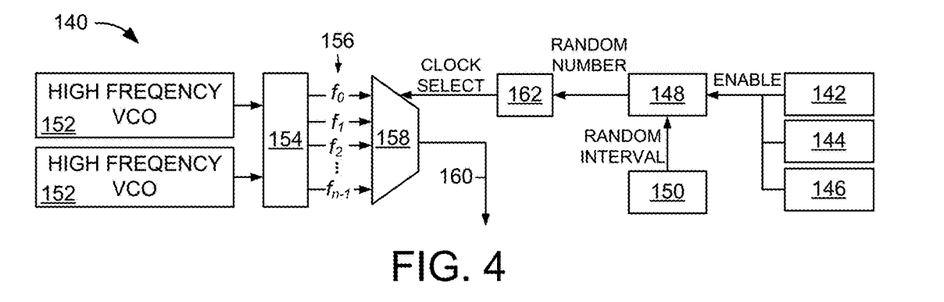
FIG. 4 depicts an example clock frequency dither circuit that can be employed in the computing system of FIG. 1.

In FIG. 4, a block representation of an example clock frequency dither circuit 140 is displayed. The dither circuit 140 can employ clock attack countermeasure logic as part of a computing device and system, such as those shown in FIGS. 1 & 2, to switch one or more clock signals, like a processor or logic block clock signal, randomly at random times. The dither circuit 140 is not limited to a particular configuration of computing components, but has a local processor 142 in the embodiment shown in FIG. 4 that communicates with a local read only memory (ROM) 144 and random access memory (RAM) 146.

When a system operation that involves previously tagged data is queued, firmware of the local processor 142 can activate a clock dither control module 148 to direct some, or all, of the execution of clock frequency dithering. The dither control module 148 can receive a random interval from an interval timer module 150 and at least one random number derived from one or more system on chip (SOC) reference clocks positioned in the same computing device as the local processor 142.

At least one voltage-controlled oscillator (VCO) 152 can generate a range of frequencies that are separated by a divider circuit 154 into a plurality of different clock frequencies 156. It is noted that the various clock frequencies can be individually unique, multiples of one another, or form a collective pattern. While the use of one or more VCO circuits is shown, other forms of oscillators (oscillator circuits) may be employed including but not limited to phase lock loop (PLL) synthesizers, crystal oscillators, etc.

One or more clock frequencies are selected by the dither control module 148 via a glitchless multiplexer 158 and utilized by the local processor 142 to execute a system operation, such as execution of a data sequence, security algorithm, or data encryption/decryption. A glitchless multiplexer 158 can be any computing component capable of eliminating a glitch, or chopped clock signal, when the clock frequency changes.

Although not limiting, it is contemplated that the glitchless multiplexer 158 is a microcontroller with a clock gate configuration that logically avoids timing and phase incongruences in the outputted clock signal 160 when a switching between different clock frequencies of from the plurality of frequencies 156. The dither control module 148 operates a frequency selection lookup table (LUT) 162 where any number of different frequencies can be selected by a uniform random number.

The lookup table 162 can allow the local processor 142 and dither control module 148 to individually, and collectively, bias the outputted clock frequencies in order to mitigate the net frequency reduction that can be associated with employing different clock frequencies during a system operation and data sequence. For instance, the processor 142 and control module 148 can repeatedly call for random clock frequencies from the lookup table 162 until a frequency is provided that has a time domain that balances a previously executed clock frequency, such as a relatively slow frequency after an executed fast frequency, or vice versa.

As a result of biasing the clock frequencies to provide a minimal net frequency reduction for the computing device/system, a host, would not be able to identify that clock frequency dithering is occurring. The dither control module 148 may further ensure predetermined intervals between clock frequency changes are maintained. For example, the dither control module 148 can ensure the interval provided by the interval timer module 150 is above minimum and below maximum times, which limits the impact of clock-stalls between glitchless frequency switches and ensures sufficient time spreading of frequency switches over the executed life of a system operation.

The use of the glitchless multiplexer 158 can provide seamless timing during a change in clock frequency. However, the glitchless multiplexer 158 can be physically larger and more electronically complex than a synchronous multiplexer. Hence, assorted embodiments arrange a clock frequency dither circuit 170 with a synchronous multiplexer 172, as displayed in the non-limiting embodiment of FIG. 5. A very high speed clock, as provided by the voltage-controlled oscillator 152, is divided down to generate the maximum frequency used by the hardware as well as multiple reduced frequencies to be used when no frequency switching occurs. It is noted that the maximum hardware frequency can be the maximum frequency capability of any component conducting a system operation, such as the processor 142 or non-volatile memory of the computing device.

Figure 5:
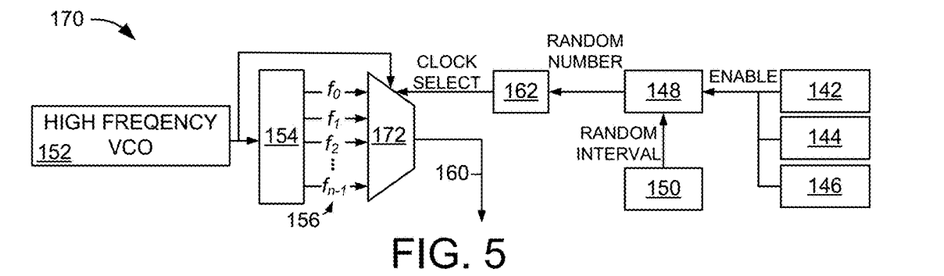
FIG. 5 represents an example clock frequency dither circuit that can be employed in the computing system of FIG. 1.
Figure 6:
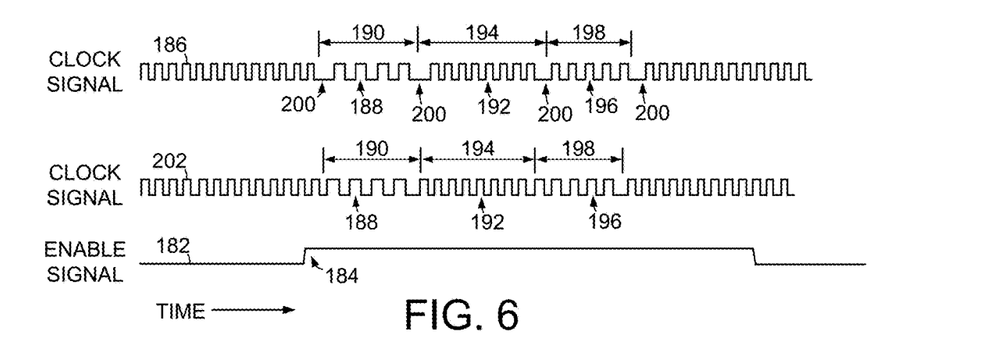
FIG. 6 provides a timing diagram for various aspects of an example computing system utilizing a clock frequency dither circuit.

As a result of utilizing the synchronous multiplexer 172, switching between different clock frequencies can be synchronous and without any pause, glitch, alteration of frequency timing. FIG. 6 depicts sample outputted clock signals that illustrate how the dither circuits 140/170 can operate in accordance with various embodiments. A switching enable signal 182 remains deactivated from the local processor 142 until a system operation is detected that triggers the processor 142 to enable clock frequency switching, which is activated at a start time 184.

The start time 184 cascades into a clock select signal from the dither control module 148 to the multiplexer 158/172. Clock signal 186 represents circuit 140 where a glitchless multiplexer 158 provides a first random clock frequency 188 for a first, randomly selected time interval 190 followed by a second random clock frequency 192 for a second time interval 194 and then by a third random clock frequency 196 for a third time interval 198. As shown by signal 186, the intervals are different and the frequencies are respectively different with the first frequency 188 considered slow, the second frequency 192 considered fast, and the third frequency 196 considered medium.

The switching of clock frequencies with the glitchless multiplexer corresponds with a timing delay 200 where each new frequency beings with a pause that is not present when a consistent clock frequency is used. In comparison, clock signal 202 is provided by the synchronous multiplexer 172 of circuit 170 and has no pause at the start of each new frequency. Hence, it can be appreciated that the implementation of clock frequency switching can be customized with the use of a glitchless or synchronous multiplexer.

Figure 7:
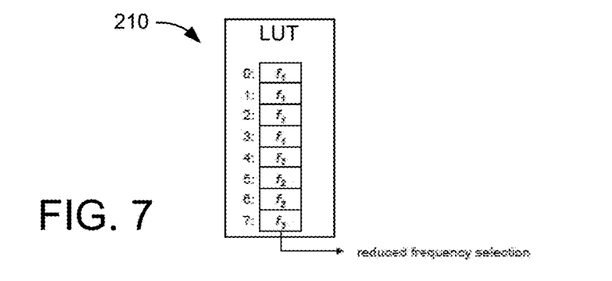
FIG. 7 conveys an example lookup table that may be created and maintained as part of the computing system of FIG. 1.

FIG. 7 represents an example frequency selection lookup table 210 that can be configured and utilized in accordance with some embodiments. When a local processor activates the dither control module, a new random frequency and random time interval are selected by the control module and subsequently stored in a programmable lookup table. The table can be indexed by a value derived from a pseudorandom number generator to mitigate the risk of patterned random numbers over time.

As shown in the non-limiting table 210, a plurality of different frequencies consist of $f_0$, $f_1$, $f_2$, and $f_3$ with $f_0$ being a maximum clock frequency and $f_3$ being the lowest clock frequency. The respective clock frequencies are indexed by a 3-bit uniformly distributed pseudorandom number generator.

In some embodiments, a state machine puts a max frequency interval between lower frequency intervals, which causes the table 210 to list clock frequencies that are lower than a default clock frequency. For the table configuration shown in FIG. 7, the net frequency would be shown by equation 1:

$$\frac{(8f_0 + 4f_1 + 3f_2 + f_3)}{16} \qquad \text{(Equation 1)}$$

Hence, a separate lookup table may be created by the dither control module for clock frequencies that are generally higher than the default clock frequency to allow for a variety of clock frequencies to be employed so that a net clock frequency is close to the default clock frequency. It is contemplated that the dither control module may bias the frequencies of a single lookup table to achieve higher range frequencies instead of having one or more separate lookup tables.

Using a non-uniform distribution of frequencies in the lookup table, as exemplified in FIG. 7, serves to weight the net frequency higher toward the default (base) clock frequency. In some embodiments, the same base clock frequency may be used by the system. In other cases, the base clock frequency may vary as well at different times of operation; a lower base clock frequency may be used in a power savings mode and a higher base clock frequency may be used during a performance mode Regardless, the frequencies in the lookup table 210 will represent frequencies that are reduced with respect to the base clock frequency. The reduced frequencies in the table may correspond to specific frequency values, or may represent selected percentages of the selected base frequency.

Regardless of the number and content of the lookup tables, the storage of selected clock frequencies allows for deliberate clock frequency distribution that favors higher frequency in order to mitigate the performance loss of net frequency reduction caused by using clock frequencies that are lower than the default clock frequency. Accordingly, a computing system can employ random clock frequency to countermeasure potential power variation monitoring attacks with minimal, or no, reduction in processor/system performance.

Figure 8:
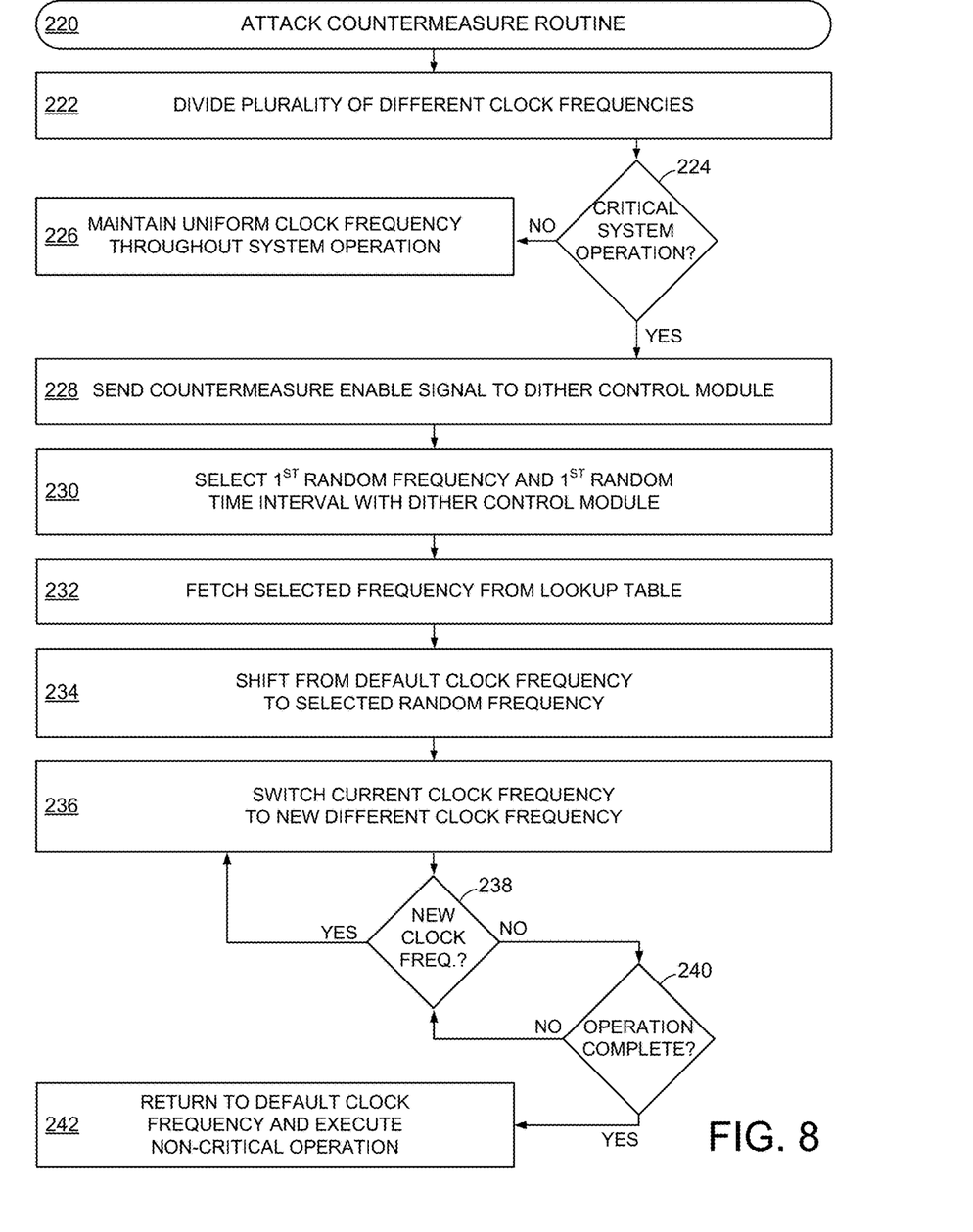
FIG. 8 is an attack countermeasure routine that is executed with the computing system of FIG. 1 in accordance

FIG. 8 provides an example attack countermeasure routine 220 that can be conducted by various embodiments of a computing system in accordance with FIGS. 1-7. A computing system is initially provided that has a local processor connected to a dither control module that can execute a randomly selected clock frequency for a random interval of time during a system operation. The preexisting computing system is utilized in step 222 to divide a voltage-controlled oscillator into a plurality of different clock frequencies.

The assorted clock frequencies may remain unused for any length of time as the local processor executes one or more system operations with a uniform default clock frequency. Decision 224 may continuously or sporadically evaluate upcoming, queued system operations to determine if the operation is critical. An operation can be deemed critical if it meets a predetermined criteria, such as involving sensitive data, relating to system security, or indicative of system settings. Decision 224 may employ a prediction module to predict the data and sensitivity of a queued system operation. The determination of decision 224 may also involve comparing a queued system operation to a known list of critical operations, such as data encryption or firmware updates.

If a pending system operation is not critical, step 226 executes the system operation while the processor is provided a uniform default clock frequency. In the event the system operation is deemed critical, decision 224 triggers the processor to send a countermeasure enable signal to the dither control module in step 228. The dither control module proceeds to select a first frequency and first timing interval in step 230 that is stored in the programmable lookup table in step 232.

Next, the default clock frequency is shifted in step 234 to the selected first clock frequency. After executing the critical system operation for the time interval randomly selected in step 230, step 236 switches from the current (first) clock frequency to a different next clock frequency. The switch of steps 234 and 236 may involve a time delay depending on if a glitchless or synchronous multiplexer is employed.

Any number of different clock frequencies may be used during the execution of the critical system operation. Decision 238 evaluates if more than two different clock frequencies are to be used. An additional, different clock frequency is then selected and utilized during the execution of the critical system operation by returning to step 236. If no additional clock frequencies are to be employed, decision 240 determines if the system operation is complete. A completed system operation prompts step 242 to return the local processor to the default clock frequency while an uncomplete system operation returns to decision 238 where the operation is continuously executed with a non-default clock frequency until decision 240 advances routine 220 to step 242.

Through the various embodiments of the present disclosure, system operations can be conducted with increased protection against attacks that monitor power variations. The ability to utilize any number of different, randomly selected clock frequencies for random amounts of time during the execution of a system operation obscures the time correlation between a data sequence and the power consumption of a computing device, such as the processor and memory aspects of the device. By maintaining a selected clock frequency lookup table, random frequencies can be distributed, or biased, to provide minimal performance loss due to the execution of an operation at reduced clock frequencies.

It is noted that the various embodiments are not limited to a data storage devices as the technology can readily be utilized in any number of other applications, such as switches, severs, and other electrical closure applications. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. A method comprising:
    generating a range of different frequencies with at least one oscillator of a clock module;
    providing a first clock frequency to a controller with a channel selector of the clock module in response to a dither control circuit;
    executing a system operation with the controller;
    changing the first clock frequency to a second clock frequency during the execution of the system operation as directed by the dither control circuit, the second clock frequency chosen from the range of different frequencies;
    executing a third clock frequency as directed by the dither control circuit, the third clock frequency chosen from the range of different frequencies in relation to the first and second clock frequencies to mitigate a net frequency reduction, the net frequency reduction corresponding with the third clock frequency having a time domain that balances a previously executed first clock frequency and second clock frequency; and
    returning to the first clock frequency at the conclusion of the execution of the system operation.

2. The method of claim 1, wherein the channel selector is a glitchless multiplexer.

3. The method of claim 1, wherein the clock module comprises first and second voltage controlled oscillators.

4. The method of claim 1, wherein the dither control circuit alters the second clock frequency to the third clock frequency during the execution of the system operation, the third clock frequency is different than the respective first and second clock frequencies.

5. The method of claim 1, wherein the dither control circuit receives a random time interval from a timer connected to the controller.

6. The method of claim 5, wherein the random time interval is verified by the dither control circuit to be greater than a predetermined minimum interval time and less than a predetermined maximum interval time.

7. The method of claim 1, wherein the dither control circuit utilizes a uniform random number to select the second clock frequency.

8. The method of claim 1, wherein the first clock frequency, second clock frequency, and third clock frequency are sequentially and is continuously provided to the controller before, during, and after the execution of the system operation.

9. The method of claim 1, wherein changing between the first and second clock frequencies obscures a time-power correlation of portions of the executed system operation.

10. A method comprising:
    generating a range of different frequencies with an oscillator of a clock module;
    providing a first clock frequency to a controller with of the clock module in response to a dither control circuit;
    executing a first system operation with the controller;
    switching the first clock frequency sequentially to second and third clock frequencies at random times during the execution of the system operation as directed by the dither control circuit, the third clock frequency chosen from the range of different frequencies and chosen in relation to the first and second clock frequencies to mitigate a net frequency reduction, the net frequency reduction corresponding with the third clock frequency having a time domain that balances a previously executed first clock frequency and second clock frequency; and
    returning to the first clock frequency at the conclusion of the execution of the system operation.

11. The method of claim 10, wherein the channel selector is a synchronous clock multiplexer.

12. The method of claim 10, wherein a lookup table is maintained by the controller and indexed by a value derived from a pseudorandom number generator.

13. The method of claim 10, wherein the net frequency reduction corresponds with an overall execution time of the first system operation being approximately the same as if the first clock frequency was exclusively used to execute the first system operation.

14. The method of claim 12, wherein the second clock frequency is greater than the first clock frequency and the third clock frequency is less than the first clock frequency.

15. The method of claim 10, wherein changing between the respective first, second, and third clock frequencies is synchronous and without a glitch.

16. The method of claim 10, wherein a second system operation is executed by the controller and the dither control circuit switches the first clock frequency to fourth, fifth, and sixth clock frequencies during the execution of the second system operation before returning to the first clock frequency, the fourth, fifth, and sixth clock frequencies are different from each other and from the first clock frequency.

17. The method of claim 16, wherein the fourth, fifth, and sixth clock frequencies each differ from the respective second, third, and fourth clock frequencies.

18. The method of claim 10, wherein switching clock frequencies during the first system operation prevent a side-channel attack relying on data-dependent power variations of the controller.

19. The method of claim 10, wherein the first clock frequency, second clock frequency, and third clock frequency are locally stored in a lookup table connected to the controller.

\* \* \* \* \*